United States Patent
Uchida et al.

(10) Patent No.: US 7,999,661 B2
(45) Date of Patent: Aug. 16, 2011

(54) SIGNAL RELAY DEVICE, COMMUNICATION NETWORK SYSTEM AND OPERATION SYSTEM

(75) Inventors: Isao Uchida, Tokyo (JP); Masanori Noguchi, Tokyo (JP); Toshiro Tomita, Tokyo (JP); Tetsuo Hoshi, Tokyo (JP); Koji Demachi, Tokyo (JP); Toshiki Ogawa, Tokyo (JP); Yoji Saito, Tokyo (JP); Hirofumi Takahashi, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 624 days.

(21) Appl. No.: 11/631,268

(22) PCT Filed: Jun. 23, 2005

(86) PCT No.: PCT/JP2005/011509
§ 371 (c)(1),
(2), (4) Date: Sep. 30, 2008

(87) PCT Pub. No.: WO2006/003828
PCT Pub. Date: Jan. 12, 2006

(65) Prior Publication Data
US 2009/0040031 A1   Feb. 12, 2009

(30) Foreign Application Priority Data

Jun. 30, 2004   (JP) .................................. 2004-192765

(51) Int. Cl.
*H04B 3/36* (2006.01)
*H04B 3/58* (2006.01)

(52) U.S. Cl. ..................................... 340/425.1; 370/338
(58) Field of Classification Search .............. 340/425.1; 370/338, 503; 710/240; 455/507
See application file for complete search history.

(56) References Cited

U.S. PATENT DOCUMENTS

| | | | | |
|---|---|---|---|---|
| 4,320,259 A | * | 3/1982 | Atkinson ...................... | 379/271 |
| 7,173,923 B2 | * | 2/2007 | Beach .......................... | 370/338 |
| 7,269,762 B2 | * | 9/2007 | Heckmann et al. ............ | 714/47 |
| 7,706,255 B1 | * | 4/2010 | Kondrat et al. ............... | 370/219 |

FOREIGN PATENT DOCUMENTS

| | | |
|---|---|---|
| JP | 11-296444 A | 10/1999 |
| JP | 2000-137662 A | 5/2000 |
| JP | 2000-138726 A | 5/2000 |

(Continued)

OTHER PUBLICATIONS

International Preliminary Report on Patentability and Written Opinion of the International Searching Authority issued in PCT/JP2005/011509 on Jan. 18, 2007 (5 pages). International Search Report, mailed Oct. 4, 2005, section C.

*Primary Examiner* — John A Tweel, Jr.
(74) *Attorney, Agent, or Firm* — Sughrue Mion, PLLC

(57) ABSTRACT

A signal relay device, a communication network system and an operation system include: a standardized logic interface conversion unit for judging a control system type or a device type and converting a signal to a signal appropriate for a communication network; or a device side logic interface conversion unit for converting a signal from the communication network to a signal appropriate for the control system type or the device type. An operation monitoring station includes a an advanced control block for the control system or the device and transmits a control signal to the communication network.

34 Claims, 6 Drawing Sheets

FOREIGN PATENT DOCUMENTS

| | | |
|---|---|---|
| JP | 2000-224167 A | 8/2000 |
| JP | 2001-16662 A | 1/2001 |
| JP | 2001-337720 A | 12/2001 |
| JP | 2002-175222 A | 6/2002 |
| JP | 2003-263226 A | 9/2003 |
| JP | 2004-88768 A | 3/2004 |

* cited by examiner

SIGNAL RELAY DEVICE, COMMUNICATION NETWORK SYSTEM AND OPERATION SYSTEM

CROSS-REFERENCE TO RELATED APPLICATION(S)

This application is a §371 application of copending international patent application PCT/JP2005/011509 which was filed on 23 Jun. 2005, and which claims priority to Japanese Patent Application Serial No. 2004-192765 which was filed on 30 Jun. 2004, both of which are incorporated by reference.

TECHNICAL FIELD

The present invention relates to a signal relay device, a communication network system and an operation system suitable for integrally monitoring, operating, controlling or maintaining, from a remote site, a control system introduced in a plant or a factory distributed regionally, or a device connected to such a control system, and the like.

BACKGROUND ART

The invention covers an operation system for integrally monitoring, operating, controlling or maintaining, from a remote site, a control system of a plurality of vendors introduced and installed in a plant or a factory distributed regionally, or a device such as a sensor or an actuator connected to such a control system. The invention also covers a wired, wireless or satellite communication network system used in the operation system, and a signal relay device installed in such a communication network system described above.

The control system refers to a system composed of a plurality of vendors, and includes, for example, a building management system, an audio/video/movie production studio, a movie theather/theather system, an amusement park system, a railroad/ship/aircraft operation management system, and a hospital system, etc.

A manufacturing system for operating a plant as an aggregate of control systems and manufacturing a desired product has been proposed, in which an operation computer for remotely operating the plant and a maintenance computer for remotely maintaining the plant cooperate to control the plant. JP-A-2001-337720 is referred to as a related art.

FIG. 1 is a block diagram showing an example of a communication network system as a related art. In FIG. 1, a plant 10, a factory 20, and an operation monitoring center 30 are connected to a communication network L.

The plant 10 has, for example, a control system S11 manufactured by Company A and a control system S12 manufactured by Company B. In the control system S11, devices a111, a112 such as a sensor and an actuator are connected, control operation is executed. In the control system S12, devices a121, a122 such as a sensor and an actuator are connected, and control operation is executed.

In a similar way, in the factory 20 is incorporated a control system S20 manufactured by Company C, devices a21, a22 such as a sensor and an actuator are connected, and control operation is executed.

The control system S11 in the plant 10 is connected to a wired or wireless communication network L via a modem m11. Similarly, the control system S12 is connected to the communication network L via a modem m12.

The control system S20 in the factory 20 is connected to the communication network L via a modem m20.

To the communication network L is connected an operation monitoring center 30. The operation monitoring center 30 executes operation and monitoring of the plant 10 and the factory 20. operation monitoring stations PC1, PC2, PC3 in the operation monitoring center 30 are connected to the communication network L via modems m31, m32, m33 respectively.

With this configuration, even in an operation system in which the plant 10, the factory 20, and the like are respectively distributed in a regional fashion, it is possible to operate and monitor the control systems S11, S12 in the plant 10 and the control system S20 in the factory 20 by using the operation monitoring PC1, PC2, PC3 installed in the operation monitoring center 30.

However, according to the above-described related art, communication protocols used by control systems differ in their manufacturers. Thus, it is necessary to implement a system with the operation monitoring stations PC1, PC2, PC3 provided in one-to-one correspondence with the control systems S1, S12 and S20. Therefore, the work to implement the entire system is complicated.

That is, stations dedicated to the control systems S11, S12, S20 respectively have to be prepared as the operation monitoring stations PC1, PC2, PC3.

When the communication network L is limited to a public phone line for example, a line must be reserved for communications.

Further, for the purpose of remote monitoring, a device for connecting, arranging and moving the operation monitoring station in an ad-hoc configuration for every control system is required.

An object of the invention is to provide a signal relay device, a communication network system and an operation system capable of easily implementing the entire system and efficiently remotely monitoring and operating the system, even though in the system, a plurality of control systems and of devices exists in which specifications of various kinds such as communication protocols differ in manufacturers.

DISCLOSURE OF THE INVENTION

A signal relay device that intermediates between a control system or a device, and a communication network, the signal relay device comprising:

a standardized logic interface conversion unit for judging a type of the control system or a type of the device, and converting the system type or the device type dependent information to a standardized logic interface which corresponds to the control system type or the device type.

In the signal relay device, the standardized logic interface conversion unit includes:

a mapping information selection unit for selecting mapping information depending on the control system type or the device type; and a conversion execution unit for converting the signal relay device to the standardized logic interface based on the selected mapping information.

In the signal relay device, the standardized logic interface conversion unit stores the mapping information.

The signal relay device further comprising;

a decryption unit for decrypting a signal from the control system or the device when the signal is encrypted;

a protocol conversion unit for converting a signal from the standardized logic interface conversion unit to a signal that is based on a predetermined protocol; and an encryption unit for encrypting the signal converted in the protocol conversion unit.

The signal relay device further comprising:

a routing control unit for selecting a transfer destination of a signal from the communication network.

A signal relay device that intermediates between a control system or a device, and a communication network, the signal relay device comprising;

a device side logic interface conversion unit for converting a signal from the communication network to a signal appropriate for a type of the control system or a type of the device.

In the signal relay device, the device side logic interface conversion unit includes;

a mapping information selection unit for selecting mapping information depending on the control system type or the device type; and a conversion execution unit for routing the signal from the communication network to the control system or the device based on the selected mapping information.

In the signal relay device, the device side logic interface conversion unit stores the mapping information.

The signal relay device further comprising:

a decryption unit for decrypting the signal from the communication network when the signal is encrypted; and a protocol conversion unit for converting the signal from the device side logic interface conversion unit to a signal that is based on a predetermined protocol.

The signal relay device further comprising:

an encryption unit for encrypting the signal converted in the protocol conversion unit.

The signal relay device further comprising;

a routing control unit for selecting a transfer destination of the signal from the communication network.

A communication network system in which an operation monitoring center is connected to a control system or a device via a communication network, the communication network system comprising:

a signal relay device including a standardized logic interface conversion unit for judging a type of the control system or a type of the device, and converting the signal relay device to a standardized logic interface which corresponds to the control system type or the device type.

In the communication network system, the standardized logic interface conversion unit includes:

a mapping information selection unit for selecting mapping information depending on the control system type or the device type; and a conversion execution unit for converting the system type or the device type dependent information to the standardized logic interface based on the selected mapping information.

In the communication network system, the standardized logic interface conversion unit stores the mapping information.

In the communication network system, the signal relay device includes:

a decryption unit for decrypting a signal from the control system or the device when the signal is encrypted;

a protocol conversion unit for converting a signal from the standardized logic interface conversion unit to a signal that is based on a predetermined protocol; and an encryption unit for encrypting the signal converted in the protocol conversion unit.

In the communication network system, the signal relay device includes a routing control unit for selecting a transfer destination of a signal from the communication network.

A communication network system in which an operation monitoring center is connected to a control system or a device via a communication network, the communication network system comprising:

a signal relay device including a device side logic interface conversion unit for converting a signal from the communication network to a signal appropriate for a type of the control system or a type of the device.

In the communication network system, the device side logic interface conversion unit includes:

a mapping information selection unit for selecting mapping information depending on the control system type or the device type; and a conversion execution unit for routing the signal from the communication network to the control system or the device based on the selected mapping information.

In the communication network system, the device side logic interface conversion unit stores the mapping information.

In the communication network system, the signal relay device includes:

a decryption unit for decrypting the signal from the communication network when the signal is encrypted; and a protocol conversion unit for converting a signal from the standardized device side logic interface conversion unit to a signal that is based on a predetermined protocol.

In the communication network system, the signal relay device includes an encryption unit for encrypting the signal converted in the protocol conversion unit.

In the communication network system, the signal relay device includes a routing control unit for selecting a transfer destination of the signal from the communication network.

In the communication network system, the operation monitoring station includes an advanced control block for the control system or the device, and transmits a control signal to the communication network.

An operation system in which a control system or a device is operated by an operation monitoring station via a communication network, the operation system comprising:

a signal relay device for transmitting and receiving a signal by judging a type of the control system or a type of the device, the signal relay device provided between the control system or the device, and the communication network, wherein the operation monitoring station includes an advanced control block for receiving a signal corresponding to the control system or the device from the communication network, executing an advanced control arithmetic operation on the signal, and transmitting the signal to the communication network.

In the operation system, the signal relay device includes a standardized logic interface conversion unit for judging a type of the control system or a type of the device, and converting the signal relay device to a standardized logic interface which corresponds to the control system type or the device type.

In the operation system, the standardized logic interface conversion unit includes:

a mapping information selection unit for selecting mapping information depending on the control system type or the device type; and a conversion execution unit for converting the system type or the device type dependent information to the standardized logic interface based on the selected mapping information.

In the operation system, the standardized logic interface conversion unit stores the mapping information.

In the operation system, the signal relay device includes:

a decryption unit for decrypting a signal from the control system or the device when the signal is encrypted;

a protocol conversion unit for converting a signal from the standardized logic interface conversion unit to a signal that is based on a predetermined protocol; and an encryption unit for encrypting the signal converted in the protocol conversion unit.

In the operation system, the signal relay device includes a device side logic interface conversion unit for converting a signal from the communication network to a signal appropriate for a type of the control system or a type of the device.

In the operation system, the device side logic interface conversion unit includes:

a mapping information selection unit for selecting mapping information depending on the control system type or the device type; and a conversion execution unit for routing the signal from the communication network to the control system or the device based on the selected mapping information.

In the operation system, the device side logic interface conversion unit stores the mapping information.

In the operation system, the signal relay device includes:

a decryption unit for decrypting the signal from the communication network when the signal is encrypted; and a protocol conversion unit for converting a signal from the device side logic interface conversion unit to a signal that is based on a predetermined protocol.

In the operation system, the signal relay device includes an encryption unit for encrypting the signal converted in the protocol conversion unit.

In the operation system, the signal relay device includes a routing control unit for selecting a transfer destination of the signal from the communication network.

In the signal relay device, the communication network system and the operation system described above, a standardized logic interface conversion unit is provided. This allows transmission of a received signal to the communication network irrespective of the types of various control systems or various devices.

The signal is encrypted when transmitted to the communication network thus providing security.

It is possible to relay a signal through a plurality of signal relay devices in transmitting the signal wirelessly from a control system or a device to a communication network. Thus, signal transmission is not influenced by the install condition of the control system or the device.

A device side logic interface conversion unit is provided so that a signal from a communication network side can be transmitted by specifying the control system type or the device type.

A signal can be encrypted when it is transmitted to each control system or when it is transmitted to each device, thus providing security.

Logic structure that is set in the standardized logic interface conversion unit or the device side logic interface conversion unit may be set remotely. This provides versatility of a control system and each device to be implemented.

A control block such as an advanced control program or an advanced control package is installed in the operation monitoring station. Thus, advanced operation and remote operation are available via the communication network from the operation monitoring station irrespective of the type of control system or device.

BEST MODE FOR CARRYING OUT THE INVENTION

Figure 1:
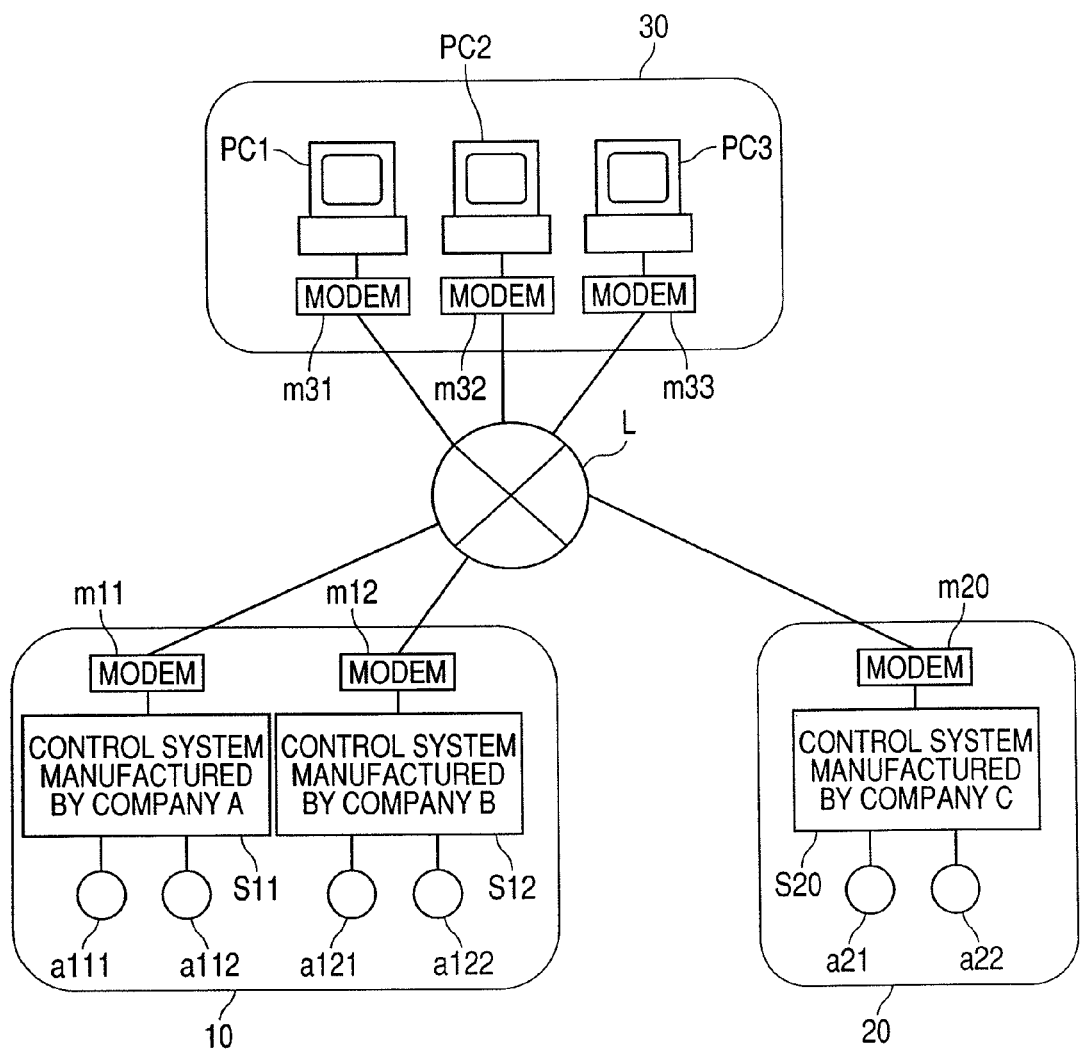
FIG. 1 It is a block diagram showing an example of a communication network system as a related art.
Figure 2:
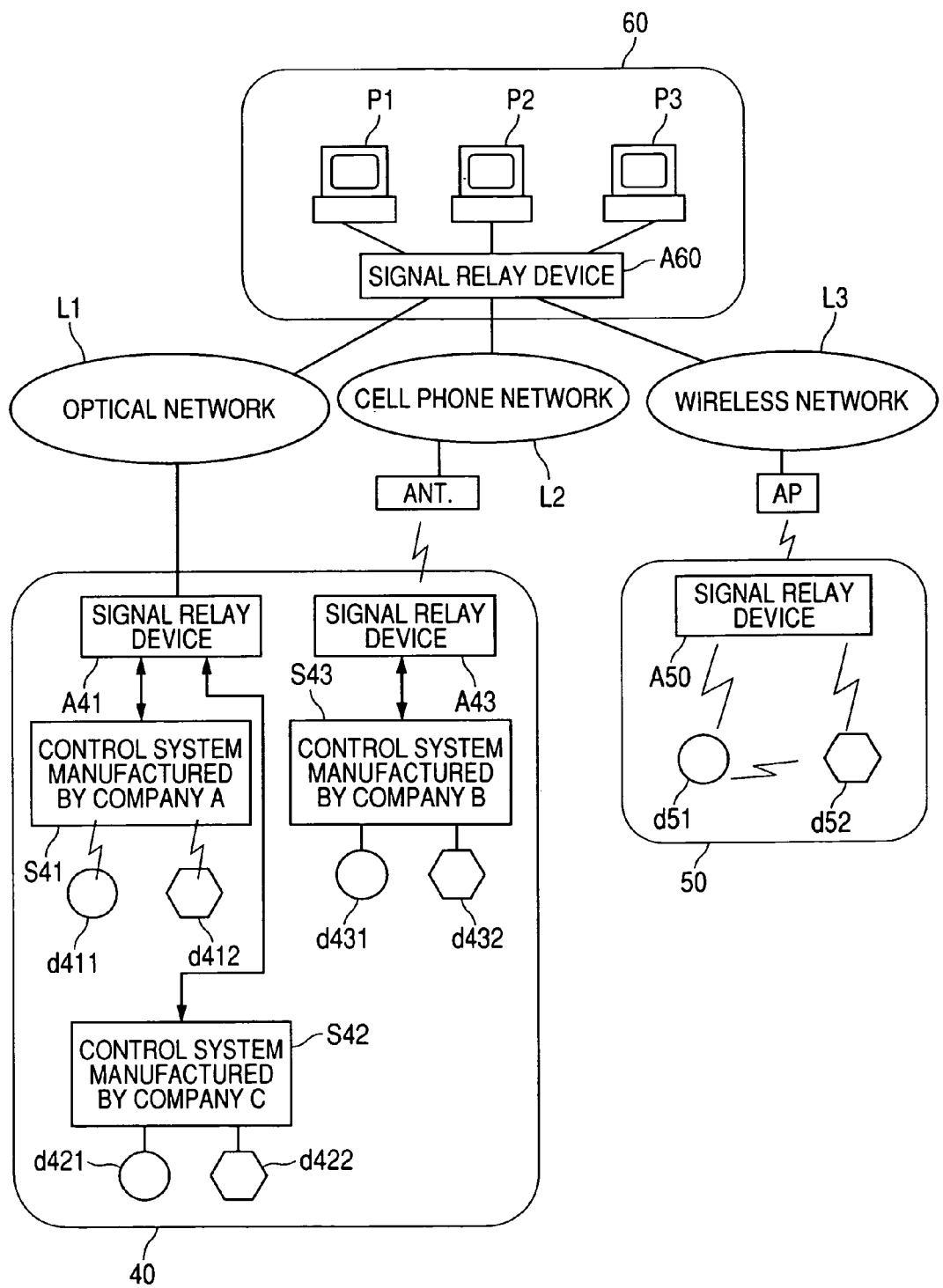
FIG. 2 It shows the entire configuration of the invention.

The invention will be detailed below with reference to drawings. FIG. 2 is a conceptual, block diagram showing the overall of a signal relay device, a communication network system and an operation system according to the invention.

In FIG. 2, a plant 40 of Company X, a factory 50 of Company Y, and an operation monitoring center 60 are distributed regionally and are respectively connected to an optical network L1, a cell phone network L2, and a wireless network L3.

The plant 40 of Company X has a control system S41 manufactured by Company A, a control system S43 manufactured by Company B, and a control system S42 manufactured by Company C.

In the control system S41, devices d411, d412 such as a sensor, an actuator, a camera and a microphone are connected via radio waves or the like, and control operation is executed. In the control system S42 also, devices d421, d422 are connected, and control operation is executed. In the control system S43 also, devices d431, d432 are connected, and control operation is executed.

In the plant 40 of Company X, according to a an install condition, system specification, infrastructure and the like, the control system S41 and the control system S42 are connected to the optical network L1 via a signal relay device A41, and the control system S43 is connected to the cell phone network L2 via a signal relay device A42.

In the factory 50 of Company Y, devices d51, d52 such as a sensor, an actuator, a camera and a microphone are directly connected to a signal relay device A50 wirelessly and perform signal transmission/reception. The signal relay device A50 is connected to a wireless network L3, and performs signal transmission/reception with the devices d51, d52.

The operation monitoring center 60 is coupled to the optical network L1, the cell phone network L2 and the wireless network L3 via a signal relay device A60, and performs signal transmission/reception with operation monitoring centers P1, P2, P3.

The operation monitoring stations P1, P2, P3 are installed in correspondence with the respective control systems S41, S42, S43 and the plant 50 of Company Y. A single operation monitoring station may be installed and made to correspond to the operation monitoring of the respective control system systems and the factory by window operation and multiple operation monitoring programs, etc.

With this configuration, the operation monitoring center 60 is connected to various networks such as the optical network L1, the cell phone network L2, and the wireless network L3, and executes operation monitoring of the control system S41, the control system S42 and the control system S43 of the plant 40 of Company X, and the factory 50 of Company Y.

Figure 3:
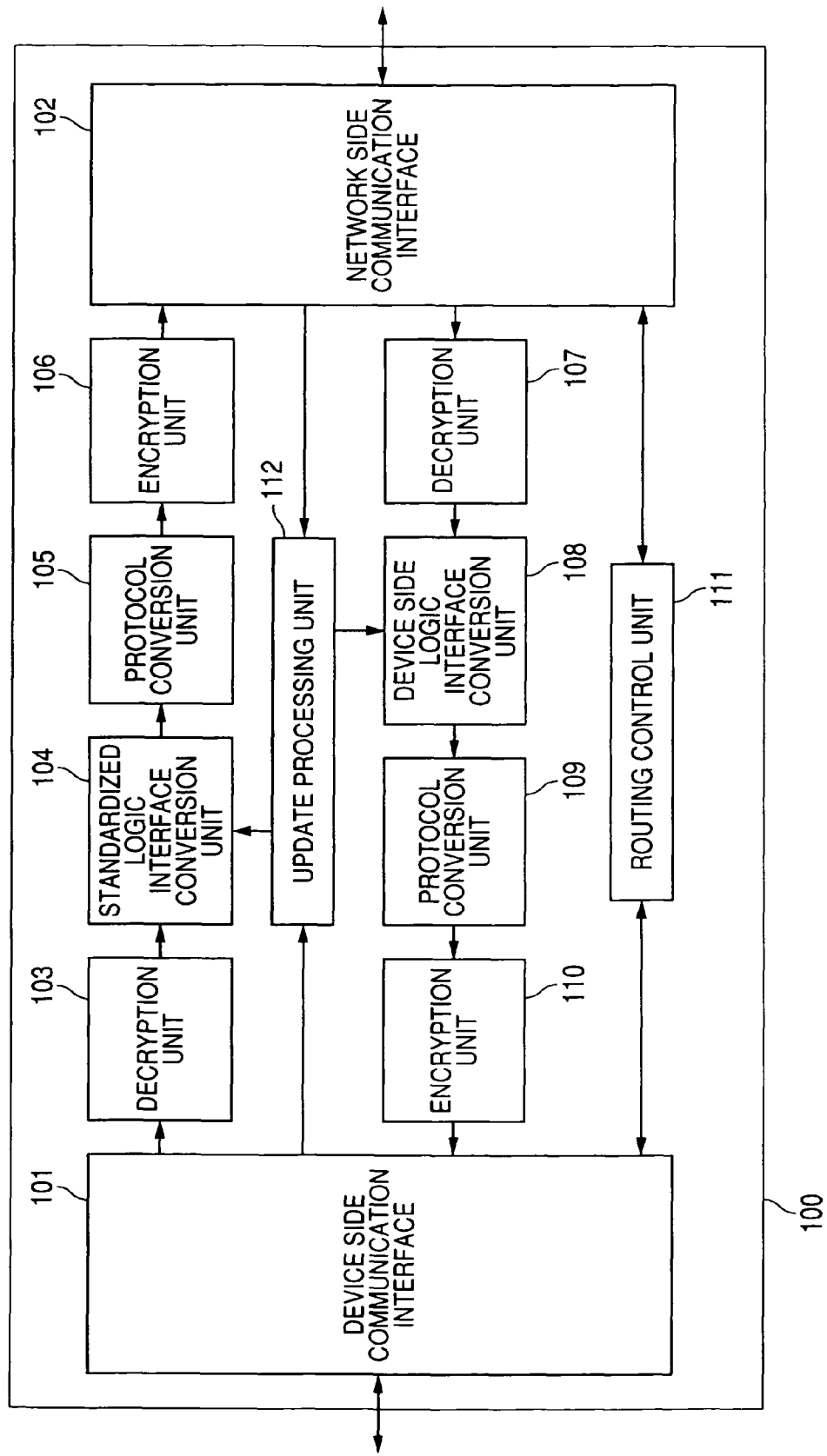
FIG. 3 It is a block diagram showing the details of a signal relay device according to the invention.

Next, details of signal relay devices A41, A43, A50, A60 will be described. The signal relay devices A41, A43, A50, A60 may employ the same configuration. FIG. 3 shows a detailed configuration thereof.

A signal relay device 100 includes, as a communication function, a device side communication interface 101 and a network side communication interface 102.

The device side communication interface 101 communicates with a control system and a device such as a sensor, an actuator, a camera and a microphone, and generally communicates with a dedicated control communication network. The communications may be made redundant in order to enhance reliability. Both wired and wireless communications are supported.

The network side communication interface 102 communicates with an electrical or optical wired network and a wireless network by electromagnetic waves, etc. The network side communication interface 102 may be connected to an optimum network depending on the network infrastructure and control system install conditions, etc.

The network side communication interface 102 may use a dedicated line. When it uses a public phone line, the network side communication interface 102 and its communication party authenticate each other and perform encrypted communications to ensure security. A wired or wireless IPv6 network may be used.

A decryption unit 103 is a decrypting block for decrypting a signal from a control system or a device that is received by the device side communication interface 101 when the signal is encrypted.

A standardized logic interface conversion unit 104 is a block for inputting a decrypted signal, recognizing a type of the signal, and converting the signal in accordance with the type of the network to be connected. For example, as shown in FIG. 2, the standardized logic interface conversion unit 104 is a block for judging whether the signal is a signal received from the control system S41 manufactured by Company A or a signal received from the control system S43 manufactured by Company B, and converting the signal to a signal that can be transmitted to the optical network L1.

Figure 4:
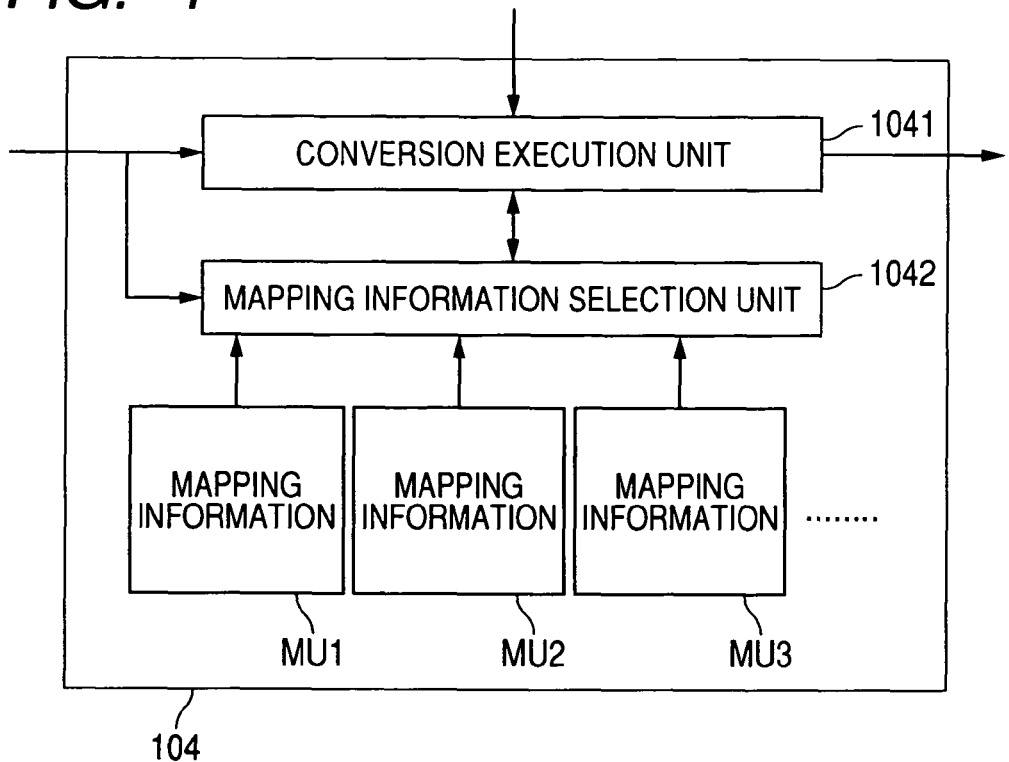
FIG. 4 It is a block diagram of a standardized logic interface conversion unit according to the invention.

Detailed configuration of the standardized logic interface conversion unit 104 is shown in FIG. 4.

The standardized logic interface conversion unit 104 has a conversion execution unit 1041 for receiving a signal from a front stage (decryption unit 103) and transmitting the converted output to a next stage (protocol conversion unit 105), and a mapping information selection unit 1042 for receiving a signal from the decryption unit 103 and the conversion execution unit 1041, judging the type of the signal, that is, the control system type or the device type, and reading out mapping information MU1, MU2, MU3, . . . corresponding to the type.

The mapping information MU1, MU2, MU3, . . . is a logical nap that associates the standardized interface that corresponds to the type of at least one control system or device to be installed.

The mapping information selection unit 1042 judges the control system type or the device type, reads out corresponding mapping information from the mapping information MU1, MU2, MU3, . . . , and provides the mapping information to the conversion execution unit 1041.

The conversion execution unit 1041 is a block for converting a signal from a control system or a device to a standardized interface signal corresponding to an upper-level communication network, according to the read out mapping information.

In such a standardized logic interface conversion unit 104, upon receiving a signal, for example, from the control system S41 manufactured by Company A, the conversion execution unit 1041 outputs an instruction signal to the mapping information selection unit 1042. The mapping information selection unit 1042 judges that a signal is received from the control system S41 manufactured by Company A, reads out the corresponding mapping information MU1, and supplies a corresponding communication signal to the conversion execution unit 1041. The conversion execution unit 1041 transmits the signal for communication to the next stage.

The mapping information MU1, MU2, MU3, . . . , in the standardized logic interface conversion unit 104 may be locally created inside the signal relay device 100, or set from a remote location. For example, the information may be downloaded by a vendor from a station remotely installed or may be uploaded or set via any other setting means.

Referring to FIG. 3 again, the protocol conversion unit 105 is a block for converting a signal converted in the standardized logic interface conversion unit 104 to a communication protocol of a communication frame or the like corresponding to a network.

The encryption unit 106 is a block for applying an encryption process on a communication protocol from the protocol conversion unit 105, and outputting the result to the network side communication interface 102.

A decryption unit 107 is a decrypting block for decrypting a signal from a network connected with the operation monitoring center 60 and received by the network side communication interface 102 when the signal is encrypted.

A device side logic interface conversion unit 108 is a block for inputting a decrypted signal and converting the signal in accordance with the control system or device for transmission. In particular, as shown in FIG. 2, the device side logic interface conversion unit 108 is a block for judging whether the signal received from the optical network L1 is a signal to be transmitted to the control system S41 manufactured by Company A or a signal to be transmitted to the control system 42 manufactured by Company B, and converting the signal to a signal appropriate for any control system or the devices d51, d52 in a case of the factory 50 of Company Y.

Figure 5:
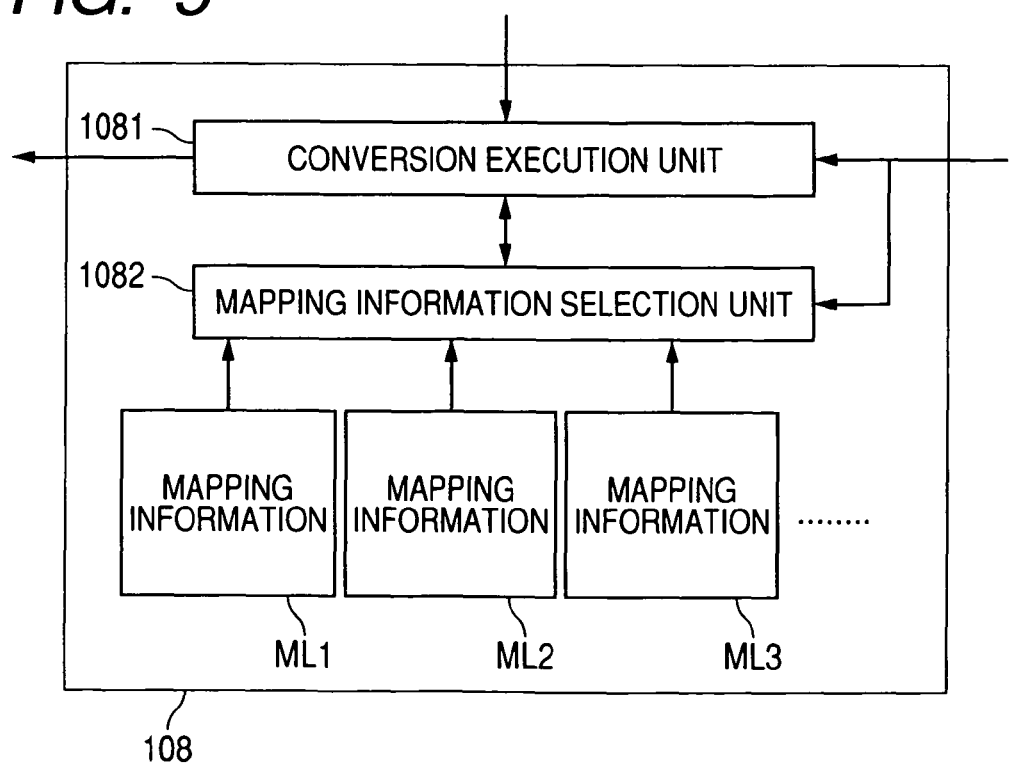
FIG. 5 It is a block diagram of a device side logic interface conversion unit according to the invention.

Detailed configuration of the device side logic interface conversion unit 108 is shown in FIG. 5.

The device side logic interface conversion unit 108 has a conversion execution unit 1081 for receiving a signal from a front stage (decryption unit 107) and transmitting the converted output to a next stage (protocol conversion unit 109), and a mapping information selection unit 1082 for receiving the signal from the decryption unit 107 and the conversion execution unit 1081, judging to which of the control system or device the signal from the communication network is to be transmitted, and reading out mapping information ML1, ML2, ML3, . . . , corresponding to the type.

The mapping information ML1 ML2, ML3, . . . , is a logical map that associates a standardized interface signal from a communication network with a dedicated signal that corresponds to the type of at least one control system or device to be installed.

The mapping information selection unit 1082 judges the communication signal from the communication network, reads out the corresponding mapping information from the mapping information ML1, ML2, ML3, . . . , and provides the information to the conversion execution unit 1081.

The conversion execution unit 1081 is a block for executing a process for converting a standardized interface signal received from the communication network to a signal corresponding to the control system or device, according to the read out mapping information.

In such a device side logic interface conversion unit 108, upon receiving a signal to be transmitted to the control system S41 manufactured by Company A, for example, from the communication network, the conversion execution unit 1081 outputs an instruction signal to the mapping information selection unit 1082. The mapping information selection unit 1082 judges that the signal is to be transmitted to the control system S41 manufactured by Company A, reads out the corresponding mapping information ML1, and supplies a corresponding control signal to the conversion execution unit 1081. The conversion execution unit 1081 transmits the signal for communication to the next stage.

The mapping information ML1, ML2, ML3, . . . , in the device side logic interface conversion unit 108 may be locally created inside the signal relay device 100, or set from a remote location. For example, the information may be downloaded by a vendor from a station remotely installed, or may be uploaded or set via any other setting means.

Referring to FIG. 3 again, the protocol conversion unit 109 is a block for converting a signal converted in the device side logic interface conversion unit 108 to a communication protocol of a communication frame or the like corresponding to a control system or a device.

The encryption unit 110 is a block for performing an encrypting process on a communication protocol signal from the protocol conversion unit 109, and outputting the result to the device side communication interface lot.

A routing control unit 111 is a block for setting the signal-relaying order of a plurality of signal relay devices 100, when a plurality of signal relay devices are installed an a signal to be transmitted is relayed from one signal relay device to another signal relay device in order to transmit the signal to a desired network, plant or factory, etc.

There are two directions for the signal-relaying direction: a direction in which a signal from a control system or a device is transmitted to a communication network or an operation monitoring center via multiple signal relay devices; and a direction in which a signal from an operation monitoring center or a communication network is transmitted to a control system or a device via multiple signal relay devices.

In any way, routing control is performed so that an alternative signal relay device for relaying a signal will be selected when a signal is to be transmitted from one signal relay device to another signal relay device, and when an abnormality occurs in the communication destination signal relay device.

An update processing unit 112 receives an update signal from outside such as from a remote site or a communication network side, or a control system or a device side, and updates the contents of the standardized logic interface conversion unit 104 or the device side logic interface conversion unit 108.

For example, the update processing unit 112 updates the mapping information, which will be described later, installed in the standardized logic interface conversion unit 104 or the device side logic interface conversion unit 108. This processing is performed by a download process, an upload process or the like.

The signal relay devices A41, A43, A50, A60 shown in FIG. 2 each has the same configuration as the signal relay device 100.

Detailed operation of the communication network system shown in FIG. 2 including a signal relay device of such configuration is described below.

The signal relay device A41 receives a signal concerning a device or the like (such as data from a device and a set value signal or operation signal for a device) as well as a signal concerning the control operation from the control system S41 manufactured by Company A or the control system S43 manufactured by Company B. Then, the signal relay device A41 identifies from which control system or device the signal is received (for example, identifies the signal is from the control system S41), performs encryption, interface conversion, protocol conversion and the like, and transmits the resulting signal to the optical network L1.

Upon receiving a signal from the optical network L1, the signal relay device A60 in the unified operation monitoring center 60 recognizes the signal is from any of the control system or the device, and routes the signal to any corresponding one of the operation monitoring stations P1, P2, P3 (for example, the operation monitoring station P1).

The operation monitoring station P1 receives a signal originated at the control system S41 from the signal relay device A60 and performs display operation or the like. Further, the operation monitoring station P1 incorporating control blocks such as a advanced control algorithm and a advanced control package, etc., inputs a signal from the control system S41 (or a device) to execute control arithmetic operation or the like, and transmits the result as an operation signal or a control signal to the control system S41 via the signal relay device A60, the optical network L1 and the signal relay device A41 to realize control operation in the control system S41.

For example, the operation monitoring station P1 may incorporate a control block corresponding to the control system S42 as well as the control block corresponding to the control system S41 and perform control in accordance with a received signal.

The signal relay devices A43, A50 also perform the same operation, Note that the signal relay device A50 is a device for directly transmitting and receiving a signal via wireless means or the like with devices such as a sensor, an actuator, a camera and a microphone, without the intervention of a control system.

Figure 6:
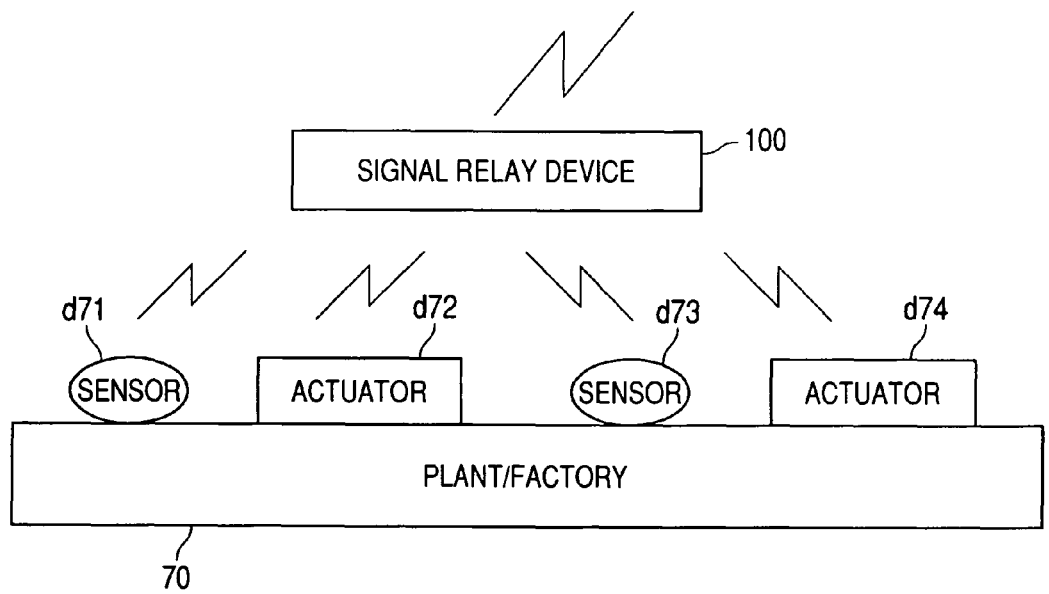
FIG. 6 It is a drawing where the signal relay device 100 according to the invention is applied to a plant, factory.

In the example shown in FIG. 6 that corresponds to the factory 50 of Company Y shown in FIG. 2, when devices d71, d72, d73, d74 such as a sensor and an actuator become advanced to provide autonomous control while a plant or factory 70 is constructed or renovated on a large scale, such devices directly communicate with the signal relay device 100 wirelessly without the intervention of a control system.

In other words, the signal relay device 100 wirelessly receives a signal from any one of the devices d71, d72, d73, d74, and transmits the signal to a unified operation monitoring station (not shown) via wireless means. The signal relay device 100 then wirelessly receives a control signal from the unified operation monitoring station and routes the control signal to one of the devices d71, d72, d73, d74.

In this way, it is possible to implement a system that is operable without a control system or various controllers in the plant or factory 70.

On that occasion, the devices d71, d72, d73, d74 may be allocated with ordinary addresses for identification by the signal relay device 100, or allocated with IPv6 addresses.

Figure 7:
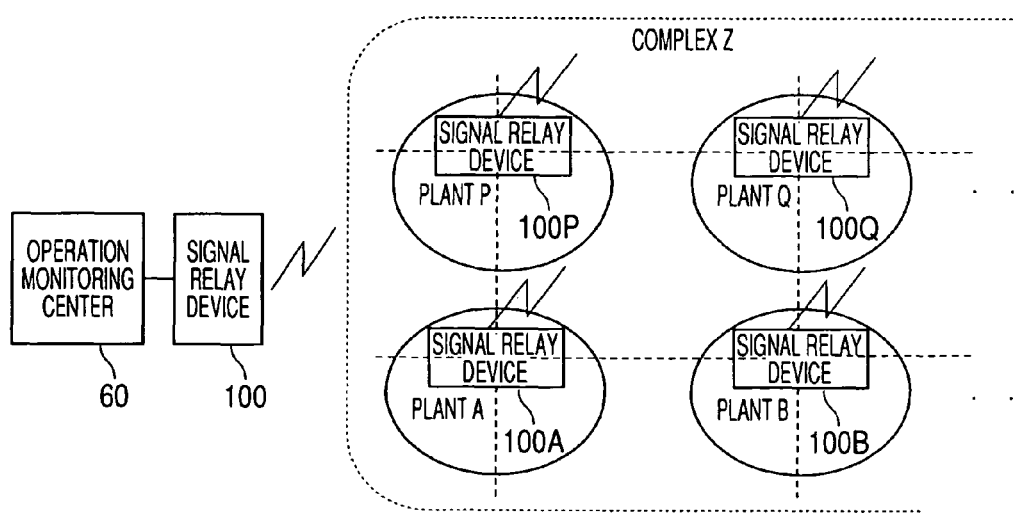
FIG. 7 It shows an example of a communication network system to which the invention is applied.

FIG. 7 shows an example where the invention is applied to a complex z of petrochemical industry or the like including a plurality of plants arranged and aggregated on an intricate wide area of a complicated geographic features or the like.

To be more precise, signal relay devices 100P, 100A, 100Q, 100B, . . . , are respectively installed in the plants P, A, Q, B, . . . . The signal relay device 100 is installed in the unified operation monitoring center 60.

In the signal relay devices 100P, 100A, 100Q, 100B, . . . , geographic features and plant arrangement situation are previously considered and the communication relay order is preset to the internal routing control unit 111 in advance.

For example, a mesh-shaped signal routing topology is set to carry a signal in the following direction: a radio signal from the signal relay device 100B is routed to the signal relay device 100Q; a radio signal from the signal relay device 100Q is routed to the signal relay device 100P; a radio signal from the signal relay device 100P is routed to the signal relay device 100A; and a radio signal from the signal relay device 100A is routed to the signal relay device 100.

Alternatively, a signal may be carried in the direction: a radio signal from the signal relay device 100 is routed to the signal relay device 100P; a radio signal from the signal relay device 100P is routed to the signal relay device 100Q; a radio signal from the signal relay device 100Q is routed to the signal relay device 100B; and a radio signal from the signal relay device 100B is routed to the signal relay device 100A.

With this setting, irrespective of the arrangement of the plants P, A, Q, B, . . . , signal transmission and reception between each of the plants P, A, Q, B, . . . , and the operation monitoring center 60 are made available, and also signal transmission and reception between the plants among the plants P, A, Q, B, . . . , are made available.

An algorithm may be set to the routing control unit that changes the radio signal relaying order to transmit a signal when an abnormality occurs in any one of the signal relay devices.

Each plant P, A, Q, B, . . . , is operable in the absence of an operation monitoring device or a controller. By employing the signal relay devices 100P, 100A, 100Q, 100B, advanced control from the operation monitoring center 60 is made available even when manufacturers of the plants P, A, Q, B, . . . , are different.

Figure 8:
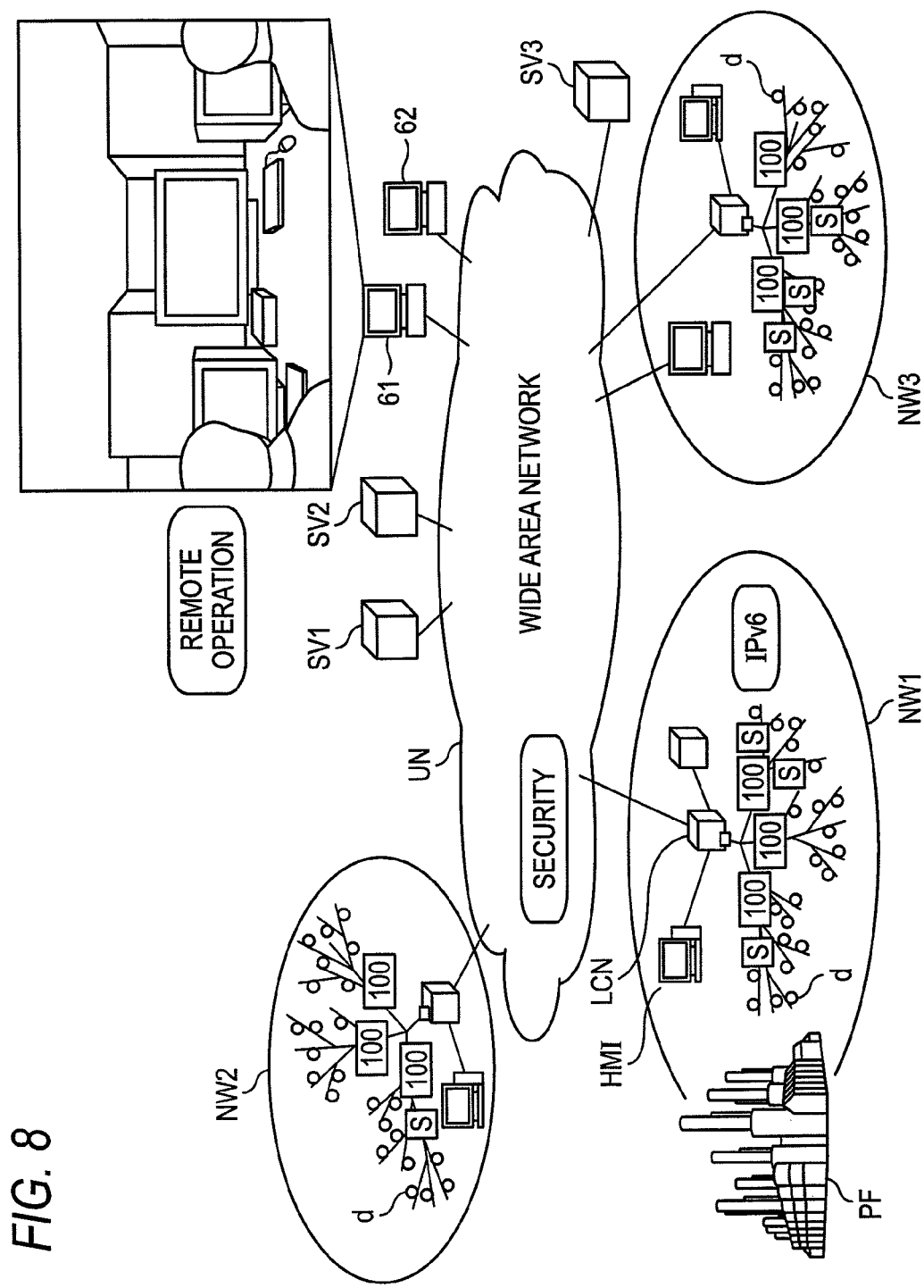
FIG. 8 It represents a concept of an operation system to which the invention is applied.

FIG. 8 represents a concept of an entire embodiment as an operation system according to the invention. In FIG. 8, a plurality of blocks 100 represent signal relay devices described above and an operation system is implemented using the signal relay devices 100.

Further, a large number of control systems s and devices d such as a sensor, an actuator, a camera and a microphone are connected via networks.

FIG. 8 also shows networks NW1, NW2, NW3 provided in the aggregate PF of plants and factories. Beside plants and factories, wired or wireless networks such as a financial system and a corporate network, the Internet, an intranet, and a dedicated network are also included in the communication network system of the invention.

For example, the network NW1 is a network that is closely related to plants and factories and includes an operation monitoring station HMI for local site, and connects to an outbound network UN via a local control node LCN. The network NW1, network NW2 and network NW3 constitute a wide area network UN.

The wide area network UN includes an operation monitoring center (operation monitoring stations 61, 62) arranged therein. The unified operation monitoring center 60 arranged on the remote site performs signal transmission/reception with the aggregate PF of plants or factories, for example, via networks UN, NW1.

The unified operation monitoring centers 61, 62 arranged on the remote site incorporates various advanced control programs and advanced control packages such as an AI block and a fuzzy logic, etc. FIG. 8 shows the control operation as a conceptual illustration above the operation monitoring station 61.

To the wide area network UN are connected servers SV1, SV2, SV3 for maintenance and operation support, etc., that complement the functions of the operation monitoring center 60 (operation monitoring stations 61, 62). This arrangement is advantageous for remote operation of the aggregate PF of plants and factories while in the operation monitoring center.

In this drawing, the network NW1 includes three signal relay devices 100 arranged thereon. Under the respective signal relay devices 100 are installed control systems s from separate manufacturers or vendors, of different specifications, models and model years or other types.

The operation system of such a configuration operates as follows:

The signal relay device 100 transmits various types of incoming data and signals to the networks NW1, UN, irrespective of the control system type s or device d to be connected.

For example, the operation monitoring station 61 specifies a control system s or device d for operation monitoring target via a network of to be connected.

Receiving the signal from the network side, the signal relay device 100 receives a signal unique to the control system or device from the corresponding control system s or device d, converts the signal to a standardized logic interface signal, and returns the signal to the network UN via the connected network MW1 or the like.

The operation monitoring station 61 receives the returned signal from the network UN and internally executes control arithmetic operation by using a advanced control program, a advanced control package or the like to obtain a control signal, an operation signal or the like.

The control signal, operation signal or the like thus obtained is transmitted from the operation monitoring station 61 to the corresponding signal relay device 100 via the network UN and the network NW1.

Receiving the control signal, operation signal or the like, the signal relay device 100 converts the interface signal corresponding to the network NW1 to a signal appropriate for the type of the control system s or the device d, and transmits the resulting signal to the corresponding control system s or device d.

The control system s or device d receives the signal, and executes control operation, operation and various types of processing.

In this way, by installing a signal relay device 100, it is possible to execute advanced control by an operator from the operation monitoring center 60 (operation monitoring stations 61, 62) irrespective of the type of the control system and the device installed in a plant or a factory connected to a communication network, and difference in Vendor X or Y, and the like. This provides remote operation such as remote maintenance and remote monitoring from a remote site.

The security of wide area network UN is sequentially updated to the latest version by way of encryption or other methods. The remaining networks NW1, NW2, NW3 may be IPv6 networks including systems and devices assigned with IPv6 addresses.

These networks UN, NW1, NW2, NW3 may correspond to a ubiquitous network.

Further, the integrated monitoring operation itself may be outsourced.

The configuration shown in FIGS. 2 to 7 may be applied to the operation system shown in FIG. 8, thereby implementing an efficient operation system with remote control capability.

The invention claimed is:

1. A signal relay device that intermediates between a control system or a device, and a communication network, the signal relay device comprising:
   a standardized logic interface conversion unit for judging a type of the control system or a type of the device, and converting the signal relay device to a standardized logic interface which corresponds to the control system type or the device type.

2. The signal relay device according to claim 1, wherein the standardized logic interface conversion unit includes:
- a mapping information selection unit for selecting mapping information depending on the control system type or the device type; and
- a conversion execution unit for converting the system type or the device type dependent information to the standardized logic interface based on the selected mapping information.

3. The signal relay device according to claim 2, wherein the standardized logic interface conversion unit stores the mapping information.

4. The signal relay device according to claim 1, further comprising:
- a decryption unit for decrypting a signal from the control system or the device when the signal is encrypted;
- a protocol conversion unit for converting a signal from the standardized logic interface conversion unit to a signal that is based on a predetermined protocol; and
- an encryption unit for encrypting the signal converted in the protocol conversion unit.

5. The signal relay device according to claim 1, further comprising:
- a routing control unit for selecting a transfer destination of a signal from the communication network.

6. A signal relay device that intermediates between a control system or a device, and a communication network, the signal relay device comprising:
- a device side logic interface conversion unit for converting a signal from the communication network to a signal appropriate for a type of the control system or a type of the device.

7. The signal relay device according to claim 6, wherein the device side logic interface conversion unit includes:
- a mapping information selection unit for selecting mapping information depending on the control system type or the device type; and
- a conversion execution unit for routing the signal from the communication network to the control system or the device based on the selected mapping information.

8. The signal relay device according to claim 7, wherein the device side logic interface conversion unit stores the mapping information.

9. The signal relay device according to claim 6, further comprising:
- a decryption unit for decrypting the signal from the communication network when the signal is encrypted; and
- a protocol conversion unit for converting the signal from the device side logic interface conversion unit to a signal that is based on a predetermined protocol.

10. The signal relay device according to claim 9, further comprising:
- an encryption unit for encrypting the signal converted in the protocol conversion unit.

11. The signal relay device according to claim 6, further comprising:
- a routing control unit for selecting a transfer destination of the signal from the communication network.

12. A communication network system in which an operation monitoring center is connected to a control system or a device via a communication network, the communication network system comprising:
- a signal relay device including a standardized logic interface conversion unit for judging a type of the control system or a type of the device, and converting the signal relay device to a standardized logic interface which corresponds to the control system type or the device type.

13. The communication network system according to claim 12, wherein the standardized logic interface conversion unit includes:
- a mapping information selection unit for selecting mapping information depending on the control system type or the device type; and
- a conversion execution unit for converting the system type or the device type dependent information to the standardized logic interface based on the selected mapping information.

14. The communication network system according to claim 13, wherein the standardized logic interface conversion unit stores the mapping information.

15. The communication network system according to claim 12, wherein the signal relay device includes:
- a decryption unit for decrypting a signal from the control system or the device when the signal is encrypted;
- a protocol conversion unit for converting a signal from the standardized logic interface conversion unit to a signal that is based on a predetermined protocol; and
- an encryption unit for encrypting the signal converted in the protocol conversion unit.

16. The communication network system according to claim 12, wherein the signal relay device includes a routing control unit for selecting a transfer destination of a signal from the communication network.

17. A communication network system in which an operation monitoring center is connected to a control system or a device via a communication network, the communication network system comprising:
- a signal relay device including a device side logic interface conversion unit for converting a signal from the communication network to a signal appropriate for a type of the control system or a type of the device.

18. The communication network system according to claim 17, wherein the device side logic interface conversion unit includes:
- a mapping information selection unit for selecting mapping information depending on the control system type or the device type; and
- a conversion execution unit for routing the signal from the communication network to the control system or the device based on the selected mapping information.

19. The communication network system according to claim 18, wherein the device side logic interface conversion unit stores the mapping information.

20. The communication network system according to claim 17, wherein the signal relay device includes:
- a decryption unit for decrypting the signal from the communication network when the signal is encrypted; and
- a protocol conversion unit for converting a signal from the device side logic interface conversion unit to a signal that is based on a predetermined protocol.

21. The communication network system according to claim 20, wherein the signal relay device includes an encryption unit for encrypting the signal converted in the protocol conversion unit.

22. The communication network system according to claim 17, wherein the signal relay device includes a routing control unit for selecting a transfer destination of the signal from the communication network.

23. The communication network system according to claim 17, wherein the operation monitoring station includes a advanced control block for the control system or the device, and transmits a control signal to the communication network.

24. An operation system in which a control system or a device is operated by an operation monitoring station via a communication network, the operation system comprising:
- a signal relay device for transmitting and receiving a signal by judging a type of the control system or a type of the device, the signal relay device provided between the control system or the device, and the communication network,
- wherein the operation monitoring station includes a advanced control block for receiving a signal corresponding to the control system or the device from the communication network, executing a advanced control arithmetic operation on the signal, and transmitting the signal to the communication network.

25. The operation system according to claim 24, wherein the signal relay device includes a standardized logic interface conversion unit for judging a type of the control system or a type of the device, and converting the signal relay device to a standardized logic interface which corresponds to the control system type or the device type.

26. The operation system according to claim 25, wherein the standardized logic interface conversion unit includes:
- a mapping information selection unit for selecting mapping information depending on the control system type or the device type; and
- a conversion execution unit for converting the system type or the device type dependent information to the standardized logic interface based on the selected mapping information.

27. The operation system according to claim 26, wherein the standardized logic interface conversion unit stores the mapping information.

28. The operation system according to claim 25, wherein the signal relay device includes;
- a decryption unit for decrypting a signal from the control system or the device when the signal is encrypted;
- a protocol conversion unit for converting a signal from the standardized logic interface conversion unit to a signal that is based on a predetermined protocol; and
- an encryption unit for encrypting the signal converted in the protocol conversion unit.

29. The operation system according to claim 24, wherein the signal relay device includes a device side logic interface conversion unit for converting a signal from the communication network to a signal appropriate for a type of the control system or a type of the device.

30. The operation system according to claim 29, wherein the device side logic interface conversion unit includes:
- a mapping information selection unit for selecting mapping information depending on the control system type or the device type; and
- a conversion execution unit for routing the signal from the communication network to the control system or the device based on the selected mapping information.

31. The operation system according to claim 30, wherein the device side logic interface conversion unit stores the mapping information.

32. The operation system according to claim 29, wherein the signal relay device includes:
- a decryption unit for decrypting the signal from the communication network when the signal is encrypted; and
- a protocol conversion unit for converting a signal from the device side logic interface conversion unit to a signal that is based on a predetermined protocol.

33. The operation system according to claim 32, wherein the signal relay device includes an encryption unit for encrypting the signal converted in the protocol conversion unit.

34. The operation system according to claim 24, wherein the signal relay device includes a routing control unit for selecting a transfer destination of the signal from the communication network.

* * * * *